US011919189B2

(12) United States Patent
Lair et al.

(10) Patent No.: US 11,919,189 B2
(45) Date of Patent: Mar. 5, 2024

(54) POSITIONING DEVICE AND POSITIONING ASSEMBLY FOR HOLDING A FLAT FLEXIBLE PART, AND SHEET MATERIAL PROCESSING MACHINE

(71) Applicant: BOBST MEX SA, Mex (CH)

(72) Inventors: Tim Lair, Bussigny (CH); Jade Sternberg, Zürich (CH); Amel Neumann, Cheseaux (CH)

(73) Assignee: BOBST MEX SA, Mex (CH)

( * ) Notice: Subject to any disclaimer, the term of this patent is extended or adjusted under 35 U.S.C. 154(b) by 0 days.

(21) Appl. No.: 18/255,169

(22) PCT Filed: Nov. 26, 2021

(86) PCT No.: PCT/EP2021/083123
§ 371 (c)(1),
(2) Date: May 31, 2023

(87) PCT Pub. No.: WO2022/122412
PCT Pub. Date: Jun. 16, 2022

(65) Prior Publication Data

US 2023/0339133 A1 Oct. 26, 2023

(30) Foreign Application Priority Data

Dec. 10, 2020 (EP) .................................... 20213168

(51) Int. Cl.
*B65H 29/68* (2006.01)
*B26D 7/01* (2006.01)
(Continued)

(52) U.S. Cl.
CPC ............. *B26D 7/015* (2013.01); *B26D 7/018* (2013.01); *B65H 9/08* (2013.01); *B65H 29/686* (2013.01);
(Continued)

(58) Field of Classification Search
CPC ........ B65H 2406/343; B65H 2406/351; B65H 29/686; B65H 29/68; B65H 29/041; B65H 2801/21; B65H 9/08
See application file for complete search history.

(56) References Cited

U.S. PATENT DOCUMENTS 3,750,507 A 8/1973 Gerber et al.
6,329,224 B1 12/2001 Nguyen et al.
(Continued)

FOREIGN PATENT DOCUMENTS

CN 104704270 A 6/2015
CN 111343884 A 6/2020
(Continued)

*Primary Examiner* — Luis A Gonzalez
(74) *Attorney, Agent, or Firm* — Bookoff McAndrews, PLLC

(57) ABSTRACT

A positioning device (38) for holding a flat flexible part, especially a sheet, on a positioning surface (46) is presented. It comprises a body (44) having a suction opening (50) for aspiring the part and a fluid port (52) being in fluid communication with the suction opening (50). Furthermore, an abutment protrusion (60) is provided on a connection surface (48) for abutting the positioning device (38) against a base part (28) to which it may be mounted. Also a sealing protrusion (64) is arranged on the connection surface (48) for compressing a gasket (42) being interposed between the positioning device (38) and the base part (28). A height ($H_a$) of the abutment protrusion (60) is bigger than a height ($H_s$) of the sealing protrusion (64). Additionally, a positioning assembly (24) is presented which comprises at least one such positioning device (38). Furthermore, a sheet material processing machine comprising at least one such positioning assembly (24) is introduced.

15 Claims, 3 Drawing Sheets

Figure 1:
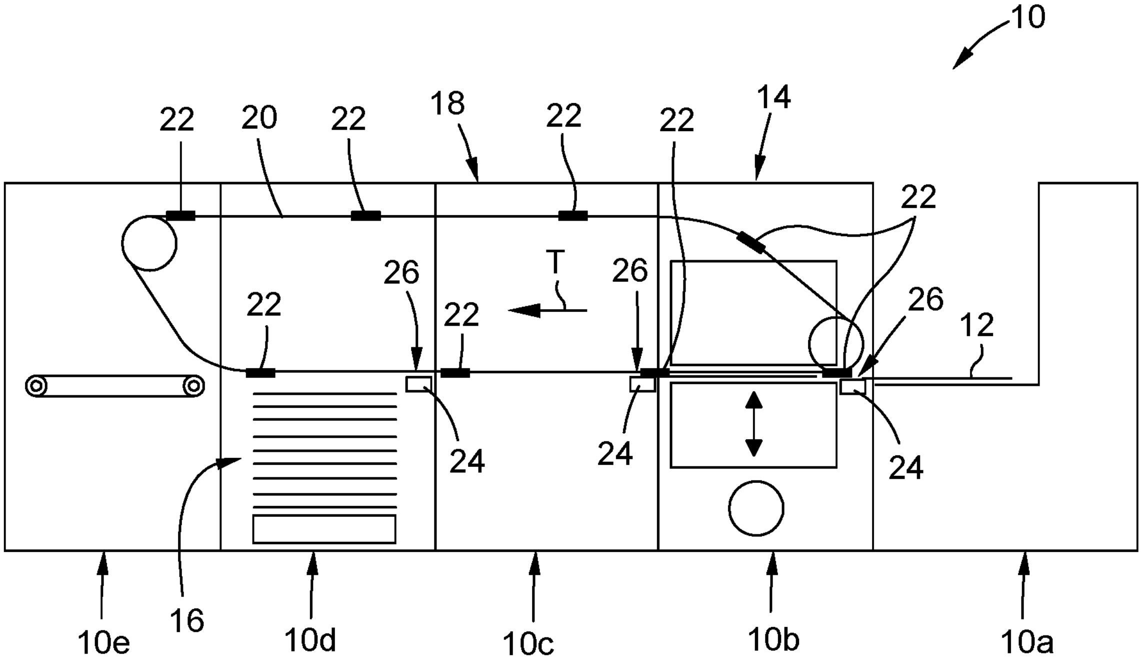

(51) Int. Cl.
*B65H 9/08* (2006.01)
*B65H 29/04* (2006.01)

(52) U.S. Cl.
CPC .. *B65H 2406/343* (2013.01); *B65H 2406/351* (2013.01)

(56) References Cited

U.S. PATENT DOCUMENTS

| | | | |
|---|---|---|---|
| 2012/0042531 | A1 | 2/2012 | Brady |
| 2016/0138718 | A1 | 5/2016 | Lee et al. |
| 2019/0119843 | A1 | 4/2019 | Baggen et al. |

FOREIGN PATENT DOCUMENTS

| | | | |
|---|---|---|---|
| EP | 1935820 | A2 | 6/2008 |
| EP | 2905515 | A1 | 8/2015 |
| KR | 1020110129211 | A | 12/2011 |
| KR | 1020150070404 | A | 6/2015 |
| WO | 2014067611 | A1 | 5/2014 |

POSITIONING DEVICE AND POSITIONING ASSEMBLY FOR HOLDING A FLAT FLEXIBLE PART, AND SHEET MATERIAL PROCESSING MACHINE

CROSS-REFERENCE TO RELATED APPLICATION(S)

This application is a National Stage Application under 35 U.S.C. § 371 of International Application No. PCT/EP2021/083123, filed on Nov. 26, 2021, which claims priority to European Application No. 20213168.6, filed on Dec. 10, 2020, the entireties of which are incorporated herein by reference.

The invention relates to a positioning device for holding a flat flexible part, especially a sheet, on a positioning surface. The positioning device comprises a body having a suction opening for aspiring the flat flexible part, wherein the suction opening is arranged within the positioning surface being an outer surface of the body, and a fluid port being in fluid communication with the suction opening, wherein the fluid port is arranged within a connection surface being an outer surface of the body.

The invention is additionally directed to a positioning assembly for holding a flat flexible part, especially a sheet, on a holding surface. The positioning assembly comprises a base part with a fluid port, at least one positioning device of the type mentioned above, and a gasket being interposed between the base part and the positioning device. The positioning device is mounted on the base part such that the respective fluid ports are in fluid communication.

The invention further relates to a sheet material processing machine comprising at least one such positioning assembly.

Sheet material processing machines, positioning assemblies and positioning devices of the types mentioned above are known in the art. Sometimes the positioning devices are also called tablets.

Sheet material processing machines, such as paper or cardboard processing machines, often comprise a plurality of processing units or stations, wherein in each of the processing units or stations a certain type of treatment is performed on the sheet material, e.g. it is cut, stripped or blanked. Usually, a conveyor system is provided within such a machine in order to transfer the sheet material from one processing unit to the next.

In order to perform the corresponding treatment in a precise and reliable manner, each of the processing units may comprise a positioning assembly of the type mentioned above. The positioning assembly may comprise one or more positioning devices of the type mentioned above. The positioning of the sheet material performed by the positioning assembly and the positioning device may be static or dynamic, i.e. the sheet material may be stationary or move while being held against the positioning surface. In the first case, the positioning device may also be designated a holding device. In the second case it may be used for decelerating the sheet material.

In all cases the sheet material to be processed spans between the positioning assembly with the at least one positioning device and a gripper unit of the conveyor system. The sheet material is held on the positioning surface such that it is precisely positioned within the machine. The sheet material is usually held on the corresponding positioning device by a suction force resulting from a fluid flow through a corresponding suction opening. A fluid port for providing or driving this fluid flow is usually provided on a base part of the positioning assembly. The gasket ensures the fluid-tight connection of the positioning device and the base part.

Consequently, known positioning assemblies always require a certain assembly effort.

It is an objective of the present invention to improve known sheet material processing machines, positioning assemblies and positioning devices. In particular, the assembly thereof shall be facilitated. Of course, the functionality of these components shall be at least kept at known levels of reliability.

The problem is solved by a positioning device of the type mentioned above, comprising an abutment protrusion being arranged on the connection surface for abutting the positioning device against a base part to which it may be mounted and a sealing protrusion being arranged on the connection surface for compressing a gasket being interposed between the positioning device and the base part. A height of the abutment protrusion by which it protrudes from the connection surface is bigger than a height of the sealing protrusion by which it protrudes from the connection surface. When mounting the positioning device on a corresponding base part, the abutment protrusion is simply abutted thereon. As a consequence thereof, the compression of a gasket being used in connection with the positioning device is determined by the difference between the height of the abutment protrusion and the height of the sealing protrusion. The compressed portions of the gasket will always be compressed to a thickness being substantially equal to this difference. Thus, the positioning device may be easily and reliably mounted to a corresponding base part of a positioning assembly. This leads to a predefined compression of the gasket. Additionally, the portions of the gasket which are compressed may be easily determined by the positions of the corresponding sealing protrusion. Undesired variations of the compression of the gasket are excluded or at least substantially reduced. The connection of the positioning device to the base part is therefore fluid-tight in the relevant areas.

The body of the positioning device according to the invention may be formed of one or a plurality of parts. However, the invention is generally independent from the number of parts from which the body is made.

According to a variant the sealing protrusion and the abutment protrusion are formed integrally with at least one part of the body of the positioning device.

The abutment protrusion and/or the sealing protrusion may be elongate when being regarded in a direction substantially perpendicular to the connection surface. Consequently, the positioning device may be abutted against a base part of a corresponding positioning assembly along a certain length. In doing so, the positioning device is precisely positioned with respect to the base part. An elongate sealing protrusion leads to a compressed portion of the gasket which is line-shaped. As a consequence thereof, the gasket offers reliable sealing properties.

Additionally or alternatively, the abutment protrusion and/or the sealing protrusion are closed geometries when being regarded in a direction substantially perpendicular to the connection surface. Consequently, an area within the sealing protrusion may be reliably separated from an area outside the sealing protrusion. Furthermore, such an abutment protrusion offers a jiggle-free abutment of the positioning device against a corresponding base part.

According to an embodiment, the abutment protrusion substantially surrounds a mounting area of the connection surface. In this context, a mounting area is to be understood as an area of the positioning device by which it is connected to a corresponding base part of a positioning assembly. If the abutment protrusion substantially surrounds the mounting area, it covers or encloses a relatively big portion thereof. This leads to a reliable and stable abutment of the positioning device against a corresponding base part.

In a variant, two or more abutment protrusions are provided on the connection surface. Thus, generally speaking, abutment protrusions may be provided on the positioning device in a number and position as needed in a specific application. The assembly of the positioning device on a corresponding base part may, thus, be facilitated, as needed.

Preferably, the sealing protrusion encloses the fluid port. Thus, the fluid port may be reliably sealed against an environment. At the same time, a portion of the gasket is selectively compressed where a sealing functionality is needed. As a consequence thereof, the gasket may be easy in structure and production.

It is possible that two or more fluid ports are provided and each of the fluid ports is enclosed by a respective sealing protrusion. As a consequence thereof, all fluid ports may be reliably sealed with respect to each other and with respect to an environment. At the same time, the gasket is only compressed in those areas where it is necessary.

A snap contour for attaching a gasket on the connection surface may be provided. Thus, especially during an assembly procedure for mounting the positioning device on a corresponding base part, the gasket is reliably held on the connection surface. The corresponding mounting procedure is therefore easy and may be performed quickly. In particular, the gasket does not move during this mounting procedure.

Additionally or alternatively, a positioning protrusion for positioning a gasket is provided on the connection surface. Such a positioning protrusion especially serves the positioning of the gasket within a plane parallel to the connection surface. To this end, the gasket preferably is abutted against the positioning protrusion. Consequently, the gasket may be reliably positioned on the positioning device.

Preferably, the snap contour is arranged on the positioning protrusion. This leads to the effects and advantages which have already been explained in connection with the snap contour in general. By providing the snap contour on the positioning protrusion, the reliability of holding the gasket in a predefined position is further enhanced.

In a variant, the height of the sealing protrusion is at least 5%, in particular at least 10%, of the height of the abutment protrusion. This leads to a reliable compression of a gasket used in connection with the positioning device.

According to an alternative, the height of the sealing protrusion is at least 0.05 mm, in particular at least 0.1 mm. Such sealing protrusions are simple in production and offer a sufficient amount of compression for a gasket.

According to another alternative, the height of the abutment protrusion is at least 0.5 mm, in particular at least 1 mm. It is understood that the height of the abutment protrusion always exceeds the height of the sealing protrusion. Such an abutment protrusion can be manufactured with standard machinery. Consequently, it can be provided at relatively low cost.

The problem is also solved by a positioning assembly of the type mentioned above, comprising at least one positioning device according to the invention, wherein a gasket is interposed between the base part and the positioning device, and wherein the positioning device is mounted on the base part such that the respective fluid ports are in fluid communication. The abutment protrusion of the positioning device abuts against the base part and the sealing protrusion at least locally compresses the gasket against the base part. In such a positioning assembly, the fluid ports of the base part and the positioning device are reliably connected and reliably sealed with respect to an environment. At the same time, the positioning device may be mounted on the base part in a simple and reliable manner since it arrives in its correct position by simply abutting the abutment protrusion on the base part. As has been explained before, the compression of the gasket, which is at least local, is determined by the difference in height of the abutment protrusion and the sealing protrusion.

The gasket may comprise an elastic material such as rubber, an elastomer in general, a silicone material, a neoprene material, a fluorine elastomer material, an ethylene propylene diene material, or a polyurethane material. The gasket may also comprise a non-elastic material like polytetrafluoroethylene, paper, mica, glass, leather, metals, or a fiber material.

Beyond that, all effects and advantages which have been mentioned in connection with the positioning device also apply to the positioning assembly and vice versa.

The problem is also solved by a sheet material processing machine of the type as mentioned above, comprising at least one positioning assembly according to the invention. Due to the fact that the positioning assembly may be assembled in a fast and easy manner, the same applies to the sheet material processing machine as a whole. As has been explained before, the positioning assembly is reliable and precise in operation. The same, thus, applies to the sheet material processing machine.

Beyond that, all effects and advantages which have been mentioned in connection with the positioning assembly and the positioning device also apply to the sheet material processing machine and vice versa.

Figure 2:
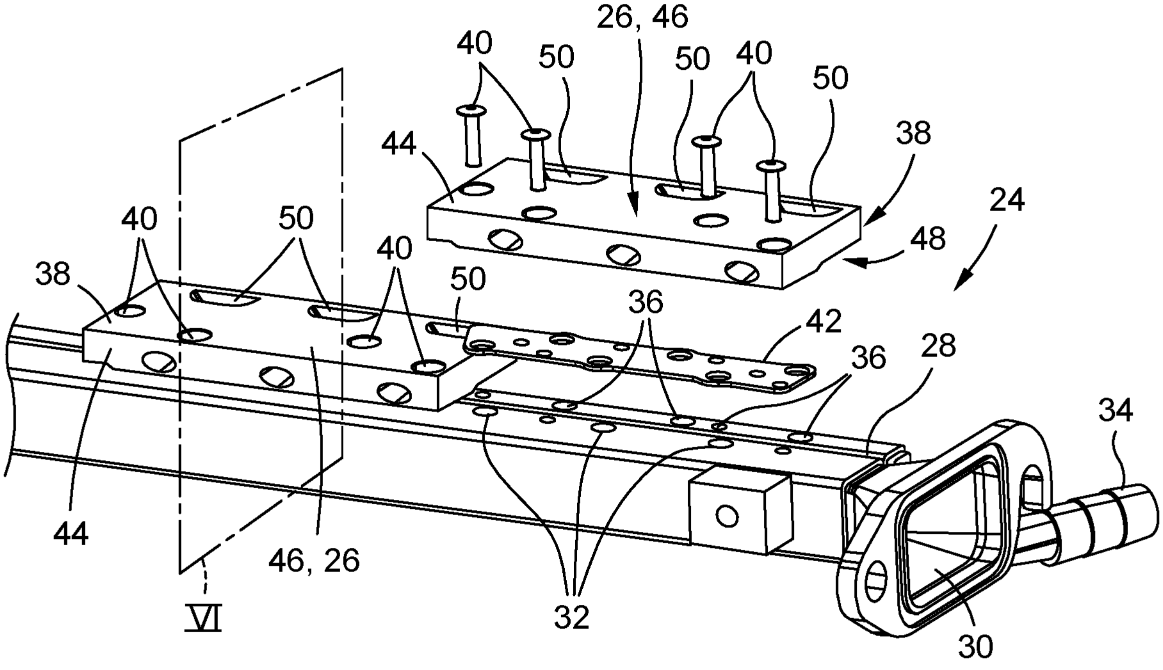
Figure 3:
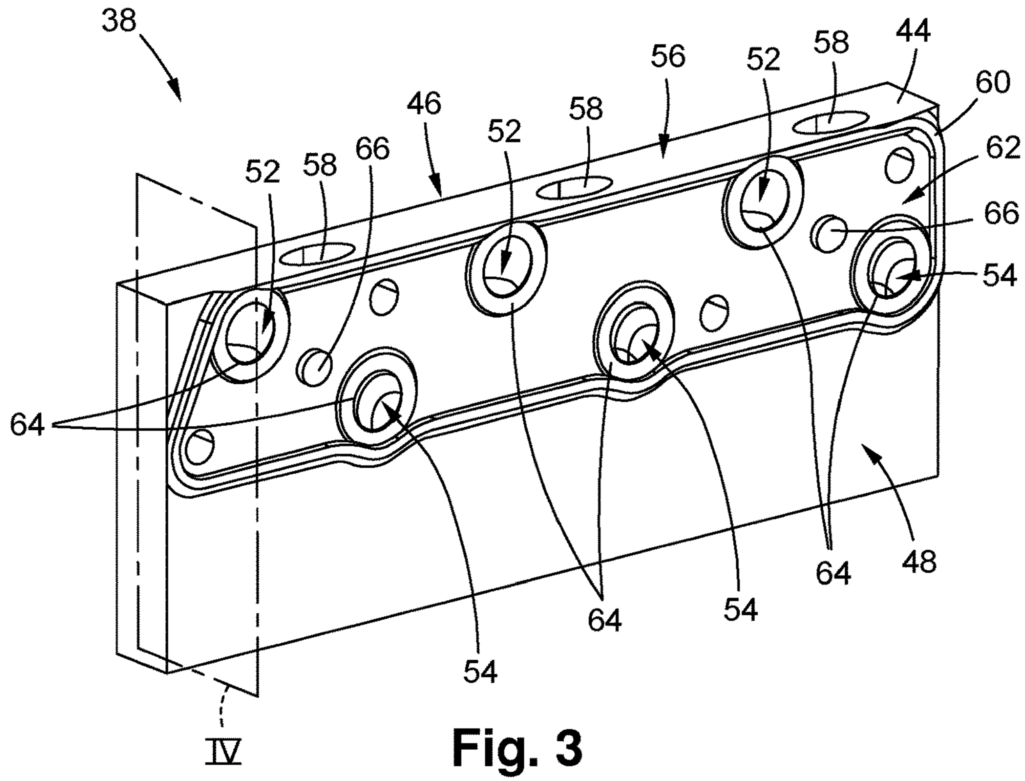
Figure 4:
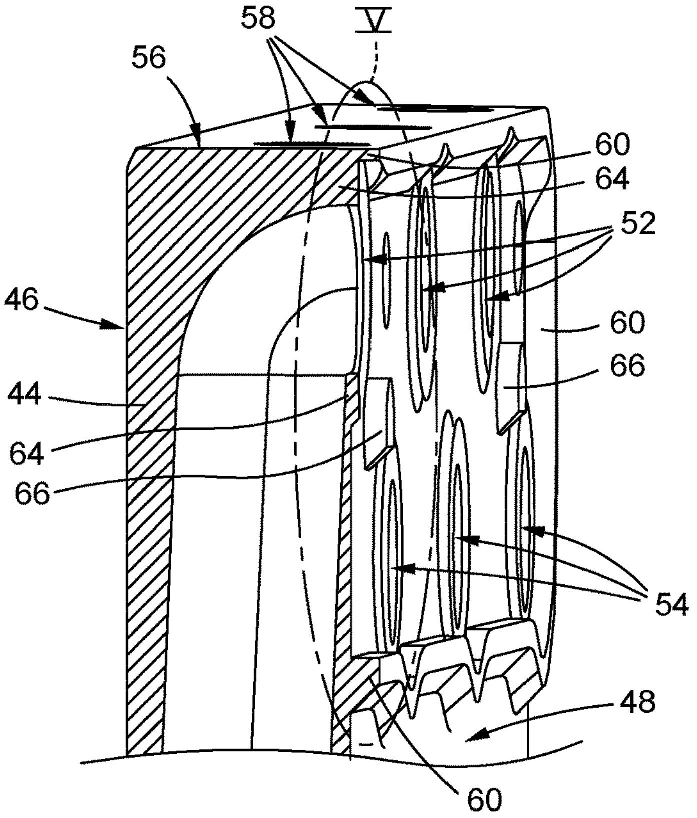
Figure 5:
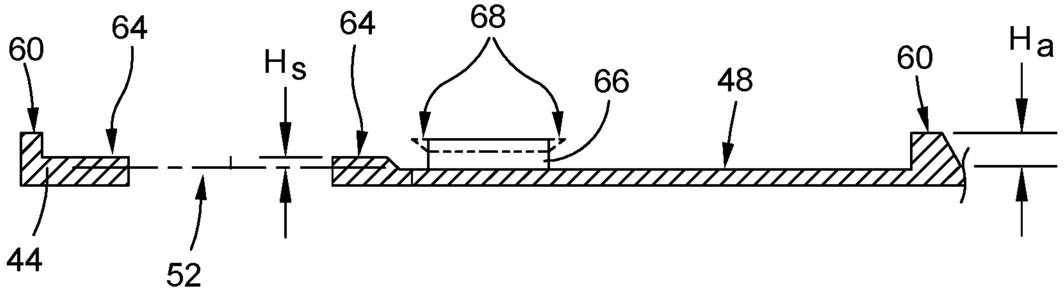
Figure 6:
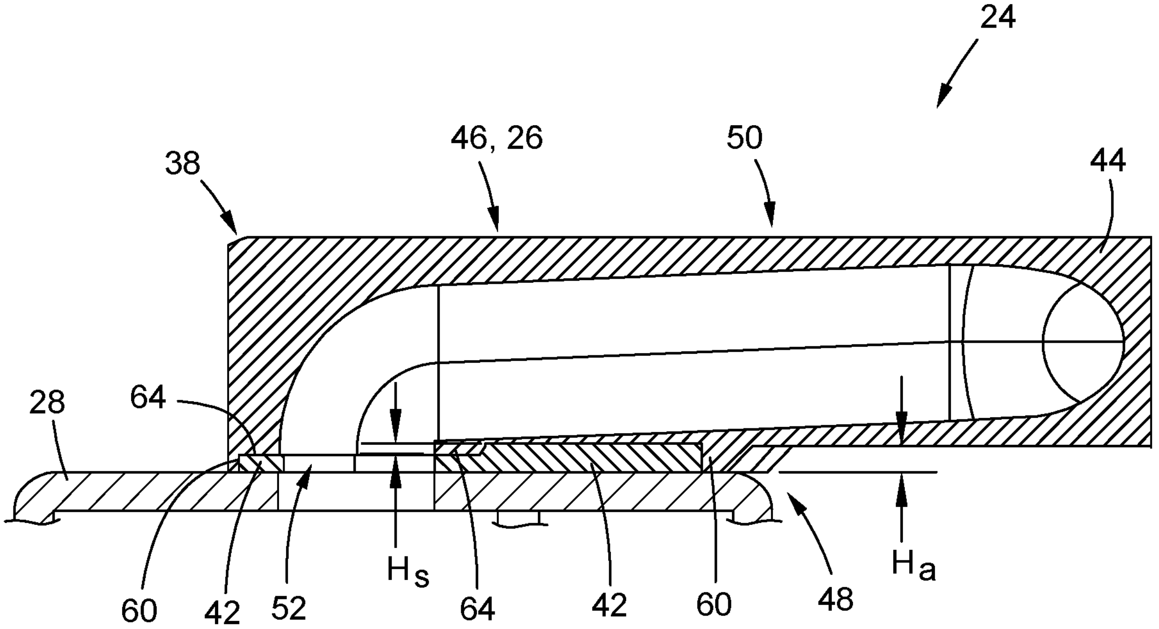

The invention will now be explained with reference to an embodiment which is shown in the attached drawings. In the drawings, FIG. 1 shows a sheet material processing machine according to the invention comprising several positioning assemblies according to the invention which each have at least one positioning device according to the invention, FIG. 2 shows a portion of a positioning assembly of FIG. 1 having two positioning devices, in a partly assembled condition, FIG. 3 shows a positioning device of FIGS. 1 and 2 in a perspective view, FIG. 4 shows a sectional view in plane IV of the positioning device of FIG. 3, FIG. 5 shows a detail V of the positioning device of FIG. 4, and FIG. 6 shows a sectional view in plane VI of the positioning assembly of FIG. 2.

FIG. 1 shows a sheet material processing machine 10 (in the following: machine 10).

In the example shown, the machine 10 is configured for cutting a sheet material and is composed of five units each performing a certain treatment on the sheet material.

A first unit is a feeder unit 10*a* for providing or feeding sheets 12 to be processed. For illustrative purposes, only one sheet 12 is represented in the feeder unit 10*a*.

The second unit comprises a platen press 14 which is configured for cutting the sheet 12. Consequently, the second unit is a platen press unit 10*b*.

The third unit is a stripping unit 10*c* which is configured for eliminating certain waste elements from the cut sheet 12.

The fourth unit is a blanking unit 10*d*. In this unit the actually desired portion of the cut sheet 12 is withdrawn therefrom and put on a pile 16.

The fifth unit is a waste evacuation unit 10*e* and serves for the elimination of further waste elements of the cut sheet 12.

The sheet 12 is transported through the machine 10 by a conveyor system 18 essentially comprising a conveyor belt 20 to which a plurality of gripper units 22 are attached, which are configured for selectively gripping the sheet 12.

The platen press unit 10*b*, the stripping unit 10*c* and the blanking unit 10*d* additionally comprise a positioning assembly 24 for holding the sheet 12, on a holding surface 26.

In the example shown in FIG. 1, the holding surface 26 is a top surface of the positioning assembly 24.

During the processing of the sheet 12 in any one of the platen press unit 10*b*, the stripping unit 10*c* and the blanking unit 10*d*, a leading edge of the sheet 12 will be gripped by a corresponding gripping unit 22 and a trailing edge of the sheet 12 will be held by the corresponding positioning assembly 24 (cf. travelling direction T).

FIG. 2 shows the positioning assembly 24 in more detail.

It comprises a base part 28 with a fluid port 30.

The fluid port 30 is designed as a fluid inlet.

Thus, pressurized air can be supplied to the base part 28 via the fluid port 30.

The base part 28 also comprises a plurality of fluid ports 32 which are in fluid communication with the fluid port 30.

These fluid ports 32 are designed as fluid outlets.

Moreover, the base part 28 comprises a cleaning fluid port 34 being designed as a fluid inlet. Thus, a cleaning fluid may be supplied to the positioning assembly 24 via the cleaning fluid port 34.

The base part 28 additionally comprises cleaning fluid ports 36 which are designed as fluid outlets being in fluid communication with cleaning fluid port 34.

In the example shown in FIG. 2, two positioning devices 38 are mounted on the base part 28 via fastening means 40, e.g. bolts or rivets.

A gasket 42 is interposed between the base part 28 and each of the positioning devices 38.

The positioning device 38 will be explained in more detail with reference to FIGS. 3 to 6. Since the two positioning devices 38 shown in FIG. 2 are substantially identical, the following explanations apply to both of them.

The positioning device 38 comprises a body 44.

One outer surface of the body 44 is a positioning surface 46.

In the representation of FIG. 2 the positioning surface 46 is the top surface of the body 44.

The body 44 also comprises a connection surface 48 also being an outer surface thereof.

The connection surface 48 is arranged opposite the positioning surface 46 and thus is a lower surface of the body 44 in the representation of FIG. 2.

On the positioning surface 46 suction openings 50 are provided. These suction openings 50 are configured for aspiring the sheet 12 such that it is held on the positioning surface 46.

On the connection surface 48 fluid ports 52 are provided. These fluid ports 52 are designed as fluid inlets and are in fluid communication with the suction openings 50.

Additionally, cleaning fluid ports 54 are arranged on the connection surface 48. These cleaning fluid ports 54 are designed as fluid inlets.

The body 44 also has a lateral surface 56 which connects the positioning surface 46 and the connection surface 48.

On the lateral surface 56 fluid ports 58 are provided. These fluid ports are in fluid communication with the fluid ports 54 and the suction openings 50. They are designed as fluid outlets.

On the connection surface 48 the body 44 has an abutment protrusion 60 for abutting the positioning device 38 against the base part 28 as will be explained below.

The abutment protrusion 60 is elongate when being regarded in a direction perpendicular to the connection surface 48.

Furthermore, the abutment protrusion 60 is a closed geometry when being regarded in this direction.

Additionally, the abutment protrusion 60 substantially surrounds a mounting area 62 of the connection surface 48, i.e. the abutment protrusion 60 substantially extends along a border of the area of the connection surface 48 which is arranged opposite the base part 28 in its mounted state (cf. FIG. 2).

The abutment protrusion 60 protrudes from the connection surface 48 by a height $H_a$ of at least 1 mm.

Additionally, a total of six sealing protrusions 64 are arranged on the connection surface 48.

The sealing protrusions 64 are configured for compressing the gasket 42 as will be explained below.

Also the sealing protrusions 64 are elongate when being regarded in a direction perpendicular to the connection surface 48.

Moreover, the sealing protrusions 64 are closed geometries when being regarded along this direction.

In the present example the sealing protrusions 64 are circle-shaped.

Moreover, each of the sealing protrusions 64 encloses one of the fluid ports 52 or one of the cleaning fluid ports 54.

The sealing protrusions 64 protrude from the connection surface 48 by a height $H_s$ of at least 0.1 mm.

The height $H_s$ of the sealing protrusions 64 is always smaller than the height H a of the abutment protrusion 60. In other words, the height $H_a$ of the abutment protrusion 60 is always bigger than the height $H_s$ of the sealing protrusion 64.

In the example shown, the height $H_s$ of the sealing protrusions 64 amounts to 10% of the height $H_a$ of the abutment protrusion 60.

Furthermore, on the connection surface 48, two positioning protrusions 66 are provided for positioning the gasket 42 on the body 44 within a plane substantially parallel to the connection surface 48.

In the example shown the positioning protrusions 66 are pin-shaped. They can also be called positioning pins.

Optionally, a snap contour 68, indicated by a dotted line in FIG. 5, can be provided on the positioning protrusion 66.

In the example of FIG. 5 the snap contour 68 is a snap collar circumferentially surrounding the positioning protrusion 66.

Using the snap contour 68 the gasket 42 can be attached to the connection surface 48.

When the positioning assembly 24 is assembled, the gasket 42 is arranged on the connection surface 48 of the body 44 of the corresponding positioning device 38.

In doing so, the gasket 42 is positioned on the body 44 using the positioning protrusions 66.

Furthermore, the gasket 42 is attached to the body 44 using the snap contour 68.

Then, the assembly of the positioning device 38 and the gasket 42 is mounted on the base part 28.

This is done such that each of the fluid ports 32 of the base part 28 is in fluid communication with a corresponding one of the fluid ports 52 of the body 44 and the each of the cleaning fluid ports 36 of the base part 28 is in fluid communication with a corresponding one of the cleaning fluid ports 54 of the body 44.

For the ease of explanation, it will now be assumed that the gasket 42 has a substantially uniform thickness which is substantially equal to the height H a of the abutment protrusion 60.

The positioning device 38 is mounted on the base part 28 such that the abutment protrusion 60 abuts against the base part 28 (cf. FIG. 6).

Consequently, those portions of the gasket 42 being in contact with a sealing protrusion 64 are compressed against the base part 28.

The amount of compression equals to the difference between the heights $H_a$, $H_s$ of the abutment protrusion 60 and the sealing protrusions 64.

Consequently, the gasket 42 is locally compressed by a predefined amount.

As a consequence thereof, the ports 30, 32, 52 and 34, 36, 54 are fluidically connected as mentioned above, respectively. These connections are fluid-tight with respect to an environment.

Thus, a driver fluid may be supplied via fluid port 30 and leave the positioning assembly 24 via fluid ports 58.

A jet pump being incorporated in the body 44 and acting on the suction openings 50 as an aspirator is driven by the driver fluid.

It is understood that in the embodiments described in connection with the Figures, the sheet 12 is used as a representative example of a flat flexible part. This means that the machine 10, the positioning assembly 24 and the positioning device 38 can also be used in connection with any other flat flexible part.

Moreover, it is understood that the single abutment protrusion 60 can be supplemented by a further abutment protrusion or can be replaced by two or more abutment protrusions, e.g. corresponding to sections of the abutment protrusion 60.

The invention claimed is:

1. A positioning device for holding a flat flexible part, especially a sheet, on a positioning surface, the positioning device comprising:

a body having a suction opening for aspiring the flat flexible part, wherein the suction opening is arranged within the positioning surface being an outer surface of the body, and a fluid port being in fluid communication with the suction opening, wherein the fluid port is arranged within a connection surface being an outer surface of the body, and an abutment protrusion being arranged on the connection surface for abutting the positioning device against a base part to which the positioning device may be mounted and a sealing protrusion being arranged on the connection surface for compressing a gasket being interposed between the positioning device and the base part, wherein a height of the abutment protrusion by which the abutment protrusion protrudes from the connection surface is bigger than a height of the sealing protrusion by which the sealing protrusion protrudes from the connection surface.

2. The positioning device according to claim 1, wherein the abutment protrusion and/or the sealing protrusion are/is elongate when being regarded in a direction substantially perpendicular to the connection surface.

3. The positioning device according to claim 1, wherein the abutment protrusion and/or the sealing protrusion are closed geometries when being regarded in a direction substantially perpendicular to the connection surface.

4. The positioning device according to claim 1 wherein the abutment protrusion substantially surrounds a mounting area of the connection surface.

5. The positioning device according to claim 1, wherein two or more abutment protrusions are provided on the connection surface.

6. The positioning device according to claim 1, wherein the sealing protrusion encloses the fluid port.

7. The positioning device according to claim 6, wherein two or more fluid ports are provided and each of the fluid ports is enclosed by a respective sealing protrusion.

8. The positioning device according to claim 1, further comprising:

a snap contour for attaching a gasket on the connection surface.

9. The positioning device according to claim 8, wherein a positioning protrusion for positioning a gasket is provided on the connection surface.

10. The positioning device according to claim 9, wherein the snap contour is arranged on the positioning protrusion.

11. The positioning device according to claim 1, wherein the height of the sealing protrusion is at least 5% of the height of the abutment protrusion.

12. The positioning device according to claim 1, wherein the height of the sealing protrusion is at least 0.05 mm.

13. The positioning device according to claim 1, wherein the height of the abutment protrusion is at least 0.5 mm.

14. A positioning assembly for holding a flat flexible part, especially a sheet, on a holding surface, comprising a base part with a fluid port, the positioning device according to claim 1, and a gasket being interposed between the base part and the positioning device, wherein the positioning device is mounted on the base part such that the respective fluid ports are in fluid communication, and wherein the abutment protrusion of the positioning device abuts against the base part and the sealing protrusion at least locally compresses the gasket against the base part.

15. A sheet material processing machine comprising the positioning assembly according to claim 14.

* * * * *